(12) United States Patent
Bader et al.

(10) Patent No.: US 9,979,180 B2
(45) Date of Patent: May 22, 2018

(54) ELECTRONIC FUSE

(71) Applicant: Infineon Technologies AG, Neubiberg (DE)

(72) Inventors: Markus Bader, Merching (DE); Goran Keser, Munich (DE)

(73) Assignee: Infineon Technologies AG, Neubiberg (DE)

( * ) Notice: Subject to any disclaimer, the term of this patent is extended or adjusted under 35 U.S.C. 154(b) by 23 days.

(21) Appl. No.: 14/518,685

(22) Filed: Oct. 20, 2014

(65) Prior Publication Data

US 2016/0109212 A1   Apr. 21, 2016

(51) Int. Cl.
*H02H 3/087* (2006.01)
*F42C 15/40* (2006.01)

(52) U.S. Cl.
CPC ............ *H02H 3/087* (2013.01); *F42C 15/40* (2013.01)

(58) Field of Classification Search
CPC .......... H02H 9/044; H02H 9/04; H02H 7/205; H02H 9/042; H02H 9/043; H02H 9/041; H02H 7/00; H02H 9/00; H03K 17/00; H03K 17/04123; H03K 17/063; H03K 17/168; H03K 17/687; H03K 17/6874
See application file for complete search history.

(56) References Cited

U.S. PATENT DOCUMENTS

| | | | | |
|---|---|---|---|---|
| 5,100,829 A | * | 3/1992 | Fay | H01L 27/0248 257/337 |
| 5,164,874 A | * | 11/1992 | Okano | H02H 9/041 361/104 |
| 6,608,468 B2 | * | 8/2003 | Nagase | G01R 31/3624 320/132 |
| 6,965,838 B1 | * | 11/2005 | Bandholz | G01R 19/16538 324/525 |
| 8,742,825 B2 | | 6/2014 | Heppenstall et al. | |
| 8,767,367 B2 | | 7/2014 | Higuchi et al. | |
| 2002/0031000 A1 | * | 3/2002 | Sakai | H02J 1/10 363/65 |
| 2003/0116820 A1 | * | 6/2003 | Daubenspeck | H01L 21/76807 257/529 |
| 2005/0135037 A1 | * | 6/2005 | Thiery | H02H 3/025 361/94 |
| 2006/0052905 A1 | * | 3/2006 | Pfingsten | H01R 9/2425 700/286 |

(Continued)

FOREIGN PATENT DOCUMENTS

CN   101156243 A   4/2008
CN   101861689 A   10/2010
(Continued)

OTHER PUBLICATIONS

Office Action, in Chinese, from counterpart Chinese Application No. 201510679006.0, dated Aug. 9, 2017, 11 pp.
(Continued)

*Primary Examiner* — Joshua E Freeman
(74) *Attorney, Agent, or Firm* — Shumaker & Sieffert, P.A.

(57) ABSTRACT

According to an example, a device is suggested, said device comprising a switching element, an integrated sensor providing a signal and an electronic fuse that is arranged to determine a fuse condition based on the signal and based on at least one fuse characteristic and to trigger a fuse event in case the fuse condition is met.

25 Claims, 8 Drawing Sheets

(56) References Cited

U.S. PATENT DOCUMENTS

| | | | | |
|---|---|---|---|---|
| 2007/0210751 A1* | 9/2007 | Wang | ................... | H02J 7/0031 320/116 |
| 2007/0241858 A1* | 10/2007 | Bessho | ............. | H01H 85/2035 337/283 |
| 2007/0255969 A1* | 11/2007 | Theobald | ................ | G06F 1/266 713/320 |
| 2008/0048215 A1* | 2/2008 | Davies | ............... | H01L 27/0262 257/274 |
| 2008/0197699 A1* | 8/2008 | Yu | .......................... | H02H 5/12 307/9.1 |
| 2008/0315815 A1* | 12/2008 | Serizawa | .................. | F01P 7/08 318/453 |
| 2009/0066404 A1* | 3/2009 | Heppenstall | ........ | H01L 27/0248 327/513 |
| 2009/0150621 A1* | 6/2009 | Lee | ...................... | G11C 7/1075 711/149 |
| 2010/0134934 A1* | 6/2010 | Matsubara | ............ | F02N 11/101 361/49 |
| 2010/0134939 A1* | 6/2010 | Takahashi | .......... | H03K 17/0822 361/87 |
| 2010/0254059 A1 | 10/2010 | Higuchi et al. | | |
| 2011/0261495 A1* | 10/2011 | Pracht | ...................... | H02H 9/02 361/93.7 |
| 2011/0267728 A1* | 11/2011 | Guillot | ............... | H03K 17/0822 361/87 |
| 2012/0146684 A1* | 6/2012 | Ebbers | ................... | G06F 21/87 326/8 |
| 2012/0327547 A1* | 12/2012 | Andersson | ............. | H02H 3/087 361/93.4 |
| 2013/0279058 A1* | 10/2013 | Seidel | ................ | H01H 85/0039 361/104 |
| 2014/0091853 A1* | 4/2014 | Okano | ............... | H03K 17/0828 327/427 |
| 2014/0268443 A1* | 9/2014 | Nassar | ..................... | H02H 9/02 361/56 |
| 2014/0285935 A1* | 9/2014 | Tsai | ........................ | H02H 3/10 361/86 |
| 2015/0009597 A1* | 1/2015 | Su | ........................... | H02H 3/10 361/79 |
| 2015/0180219 A1* | 6/2015 | Held | ....................... | H02H 3/18 361/84 |
| 2015/0249332 A1* | 9/2015 | Kang | ..................... | H02H 9/044 361/91.1 |
| 2015/0249333 A1* | 9/2015 | Kang | ...................... | H02H 9/02 361/91.1 |
| 2015/0349471 A1* | 12/2015 | Maki | .................. | H01R 13/6691 307/10.1 |
| 2016/0006368 A1* | 1/2016 | Kusuno | ................. | H02M 7/487 363/131 |
| 2016/0013639 A1* | 1/2016 | Willkofer | ............... | H02H 9/044 361/56 |
| 2016/0094057 A1* | 3/2016 | Fiedler | ............... | G05B 19/0426 320/107 |
| 2016/0097820 A1* | 4/2016 | Thompson | ......... | G01R 31/3655 320/134 |

FOREIGN PATENT DOCUMENTS

| | | |
|---|---|---|
| CN | 102354958 A | 2/2012 |
| CN | 103490374 A | 1/2014 |
| CN | 103490390 A | 1/2014 |
| CN | 103972869 A | 8/2014 |

OTHER PUBLICATIONS

Office Action, in Chinese language, from counterpart Chinese Application No. 201510679006.0, dated Mar. 13, 2018, 11 pp.

* cited by examiner

ELECTRONIC FUSE

BACKGROUND OF THE INVENTION

Embodiments of the present invention relate to an electronic fuse which provides various fuse functionalities.

SUMMARY

A first embodiment relates to a device comprising
a switching element,
an integrated sensor providing a signal,
an electronic fuse that is arranged
   to determine a fuse condition based on the signal and based on at least one fuse characteristic,
   to trigger a fuse event in case the fuse condition is met.

A second embodiment relates to a method for controlling a switching element comprising:
determining a fuse condition based on a signal provided by an integrated sensor of the switching element and based on at least one fuse characteristic,
triggering a fuse event in case the fuse condition is met.

A third embodiment relates to a device comprising
means for determining a fuse condition based on a signal provided by an integrated sensor of the switching element and based on at least one fuse characteristic,
means for triggering a fuse event in case the fuse condition is met.

A fourth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Examples provided herein in particular relate to a modular fuse concept, which may, e.g., be supplied as an add-on to existing components or systems. An electric load may be safeguarded pursuant to norm ISO 26262 (ASIL-B, Automotive Safety Integrity Level) via a semiconductor switch. The semiconductor switch may be a high-side switch. Such high-side switch is directly or indirectly connected between a supply voltage and a load (in contrast to a low-side switch that is directly or indirectly connected between a load and ground).

Functional safety may be provided via at least one autarkic entity, in particular at least two autarkic entities in order to reduce the failure probability of a fuse. The autarkic entity may be a hardware entity or a software entity. It is in particular an option to provide at least one hardware entity and at least one software entity. At least two of such entities may monitor each other.

Fuse in this context may be any safeguarding unit(s) that may in particular avoid the load from being damaged or destroyed.

Protection of the load can be achieved via a commonly known irreversible mechanical fuse (also referred to herein as "conventional fuse" in contrast to the electronic fuse). Blowing this fuse requires its replacement. This would lead to an outage of the load, which may not be acceptable in various safety scenarios, e.g., an airbag control when a vehicle is in operation.

According to an exemplary solution, an electronic fuse is provided comprising functional safety. Such electronic fuse may fulfill predefined ASIL requirements.

For example, a circuitry (hardware) and/or software may be part of the electronic fuse and each of the entities (hardware and/or software) may replicate the functionality of the conventional fuse.

The electronic fuse may in particular bear at least one of the following advantages:
   the electronic fuse can be switched on and off; such switching may be defined in a more precise way compared to the conventional fuse;
   as the electronic fuse can be controlled in a more defined way, a wire cross section may be reduced which would also lead to a reduction in weight and costs (considering, e.g., an automotive wiring harness);
   the probability of failure can be reduced by introducing redundancy;
   the electronic fuse may (at least partially) be integrated in the semiconductor switch;
   the electronic fuse can be reset and/or switched (on or off) in a controlled manner;
   the electronic fuse may have a self-testing capability which would lead to a further increase of its functional safety;
   the electronic fuse may be controlled by a supervisory instance (e.g., an electronic control unit), which sets or changes a mode of operation; for example, the electronic fuse may be controlled by this supervisory instance such that it is not reset in case of a crash.

The electronic fuse may in particular comprise at least two entities, e.g., hardware and software. The electronic fuse may utilize a current-dependent output signal of a high-side switch (e.g., a current or any derived signal) and it may define at least one fuse condition, e.g., switch-off condition based on a fuse characteristic. The fuse characteristics may be modelled, simulated or emulated (reproduced). In other examples, multiple fuse characteristics or conditions may be used to trigger the fuse condition.

The current-dependent output signal of a high-side switch may be used as input signal for a control unit (e.g., a microcontroller or a processor) for the software running on the control unit to model the functionality of the fuse.

Figure 1:
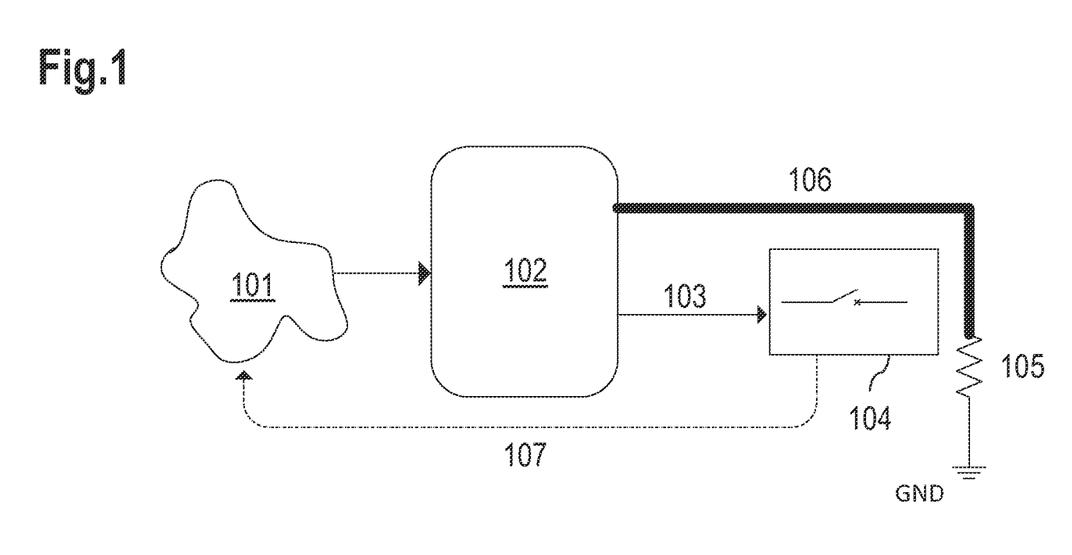
FIG. 1 shows an exemplary block diagram with an electronic fuse controlling a switching element, e.g., a PROFET.

FIG. 1 shows a logic 101 (comprising, e.g., a control or processing device) that drives a semiconductor switch 102, e.g., a power semiconductor switch as a PROFET. The semiconductor switch 102 is connected to a load 105 via a wire 106. The semiconductor switch 102 supplies a load-dependent signal 103, e.g., a current, to an electronic fuse 104. The electronic fuse 104 indicates to the logic 101 whether (or not) a fuse condition, e.g., switch-off condition, is met (see signal 107). The logic 101 may then switch off the semiconductor switch 102.

The electronic fuse 104 may provide its signal 107 to the logic 101, which may then control the semiconductor switch 102 according to the fuse condition. Hence, pursuant to the signal 107 the logic 101 may switch off the electronic switch (for a predefined amount of time, e.g., until a reset is conducted).

As an alternative, the signal 107 may be fed to the semiconductor switch 102 to stop the switch from being switched on.

The electronic fuse 104 may comprise at least one entity, each entity being either of the type hardware or software. For redundancy purposes, several entities may be provided, wherein at least two of the entities may be of different types.

The hardware as well as the software may both have an impact on the switching behavior of the high-side switch and hence on the current flowing through the load.

The hardware and the software may be (logically and/or physically) connected with each other. Both entities (hardware and software) may monitor each other. In case an error is detected in one of the entities, the load is still safeguarded, because the functionality of the electronic fuse can be provided by the other (non-defective) entity.

The malfunction (e.g., error, breakdown) can be reported to the supervisory instance. The supervisory instance may decide how an operation of the electronic fuse with one defective entity is handled. For example, the electronic fuse may be activated, de-activated, replaced, repaired, etc.

It is also an option that at least one of the entities may be tested on demand (e.g., independently from the actual mode of operation). During such test the respective other entity may provide the functionality of the fuse.

Figure 2:
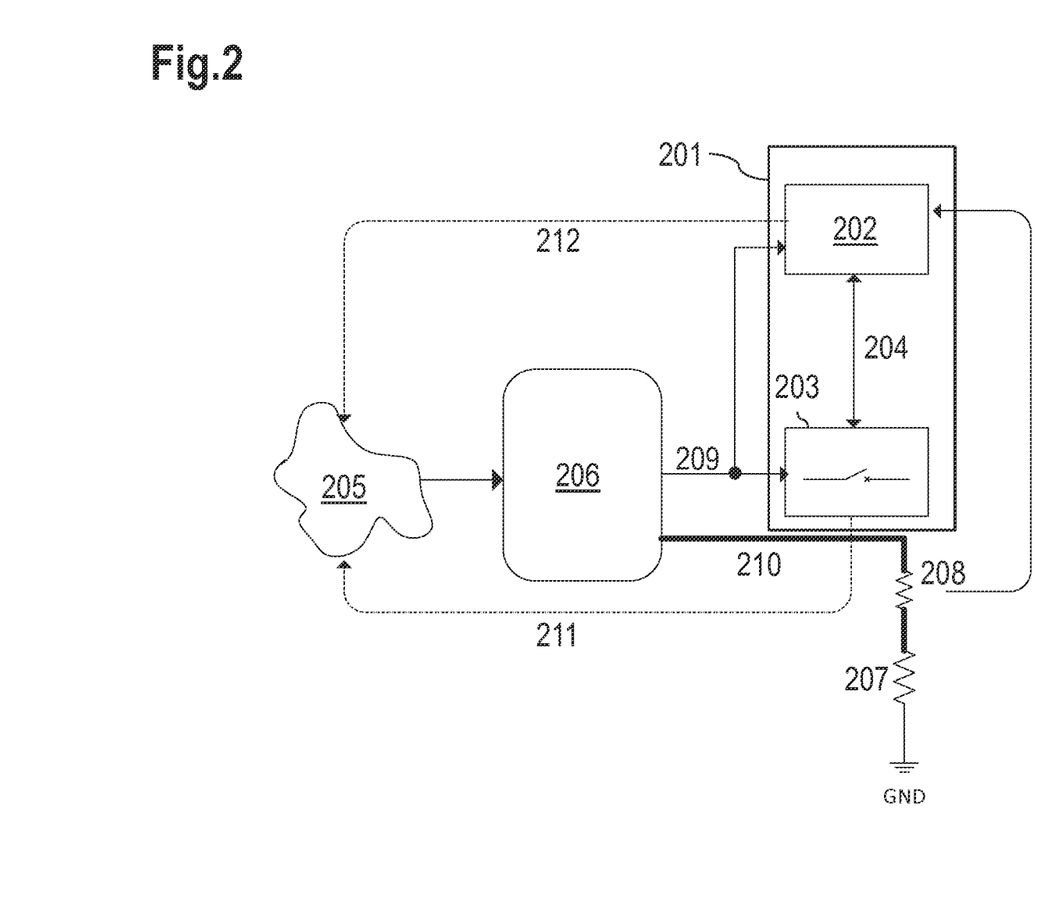
FIG. 2 shows another exemplary block diagram with an electronic fuse comprising a hardware entity and a software entity.

FIG. 2 shows an exemplary circuitry comprising an electronic fuse 201 with a software entity 202 and a hardware entity 203. Both entities, software 202 and hardware 203, may monitor each other (see connection 204).

A logic 205 (comprising, e.g., a control or processing device) drives a semiconductor switch 206, e.g., a power semiconductor switch as a PROFET. The semiconductor switch 206 is connected to a load 207 via a wire 210 and a sense resistor 208 (also referred to as shunt). The semiconductor switch 206 supplies a load-dependent signal 209 to the hardware 203 and to the software 202.

As an option, a resistor 208 may be provided that supplies a voltage across said resistor 208 (and thus a current through the resistor 208) to the software 202.

It may be another option that the hardware 203 supplies information to the software 202.

Based on its input, the hardware 203 determines whether (or not) a switch-off condition is met and conveys its finding to the logic 205 (see signal 211). In addition, based on its input, the software 202 determines whether (or not) a switch-off condition is met and conveys its finding to the logic 205 (see signal 212). The logic 205 may then switch off the semiconductor switch 206.

Figure 3:
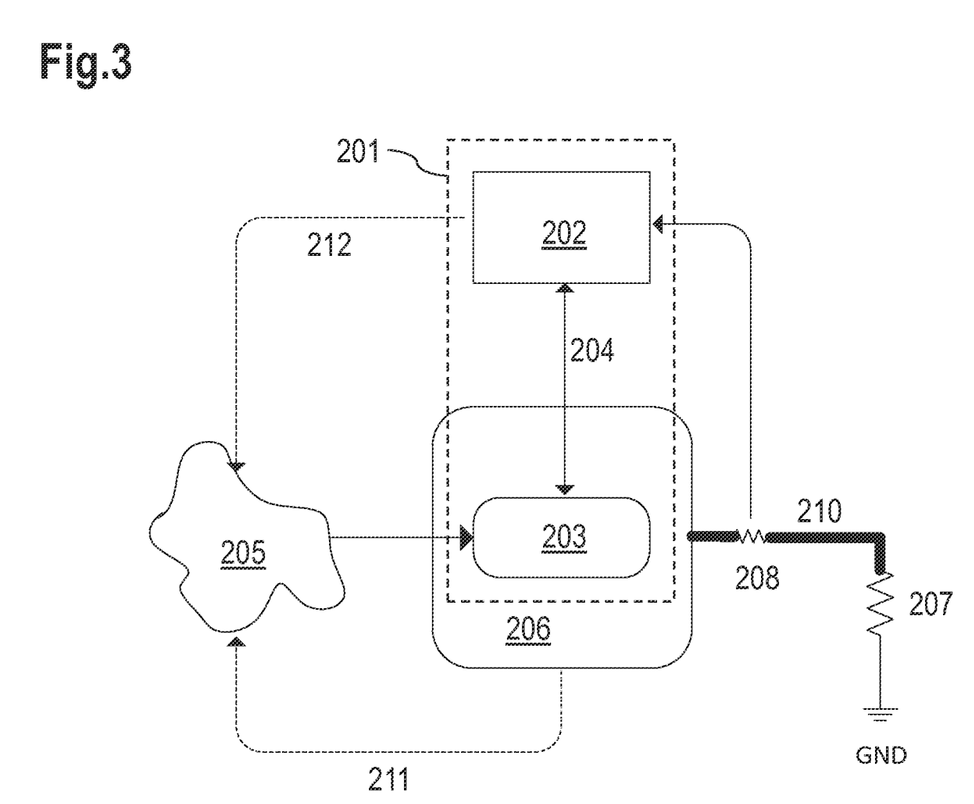
FIG. 3 shows a further exemplary block diagram with an electronic fuse that is partially integrated in the switching element.

FIG. 3 shows an alternative embodiment, wherein the hardware 203 is integrated with the semiconductor switch 206. In this example, the hardware 203 uses the signal provided by the semiconductor switch 206 and the software is supplied via the resistor 208 with a voltage (or current) to determine whether a fuse condition is met.

It is noted that the hardware 203 may have self-diagnosis (testing) capabilities.

The examples presented may in particular be utilized in automotive scenarios. For example, low-volt topologies may combine using 12V and 48V as supply voltages. A centralized fuse box in a vehicle may be replaced by a conductor rail; instead of conventional fuses, electronic fuses as described herein may be connected to this conductor rail and they may be placed at various locations throughout the vehicle. This bears the advantage that the electronic fuses may be placed where they are actually needed. In addition the electronic fuses may be arranged at locations that are barred from unwanted physical access, which may further increase the level of safety and security.

The characteristics (e.g., an $I^2t$-characteristics) of an conventional automotive fuse (e.g., an ATO, maxi, mini or micro fuse) may be modelled by the electronic fuse, e.g., the hardware and/or the software of the electronic fuse.

The electronic fuse may be added to a protected field effect transistor (FET), also referred to as "PROFET", to provide safety and/or security features. The electronic fuse may comprise at least one hardware entity and/or at least one software entity. The hardware may comprise an analog circuit and it may be flexibly adapted or adaptable to an external load. The hardware may further compensate device tolerances. The software may implement a fuse characteristics, e.g., based on current and time, and it may be supplied by a microcontroller.

Hardware and software may operate in a mutual manner making the system safer and more secure.

Figure 4:
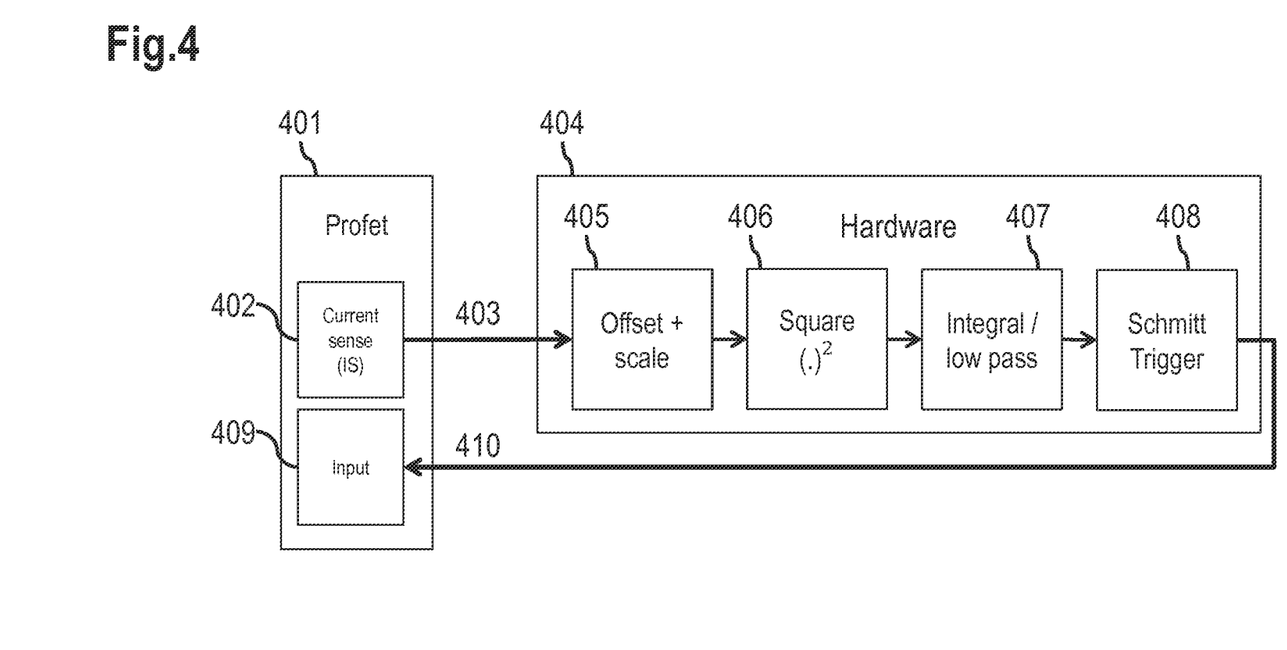
FIG. 4 shows an exemplary block diagram of a hardware entity.

FIG. 4 shows a schematic diagram comprising a PROFET 401. The PROFET 401 may be a power semiconductor switch. The PROFET 401 comprises a current sense component 402 that supplies a sensed current 403 to a hardware 404.

The semiconductor switch may be a vertical element comprising
   a control terminal,
   a first terminal,
   a second terminal,
   wherein the first and the second terminal are electrically coupled via a signal applied to the control terminal and
   wherein the control terminal and the first terminal are arranged on one side of the vertical element and the second terminal is arranged at the opposite side of the vertical element.

The opposite side of the vertical element may also be connected to a load. The second terminal may be a collector of an electronic switch, in particular a transistor or IGBT. The first terminal may be an emitter and the control terminal may correspond to a gate of an IGBT or a base of a bipolar transistor. In case of a MOSFET, the source may correspond to the first terminal and the drain may correspond to the second terminal.

The hardware 404 comprises an offset and scale component 405, a square component 406, an integral and low-pass component 407 and a Schmitt trigger 408.

Hence, the sensed current 403 is scaled and combined with an offset, squared, integrated and low pass filtered and processed by the Schmitt trigger 408. The output of the Schmitt trigger 408 is conveyed as a signal 410 to a input component 409 of the PROFET 401.

Figure 5:
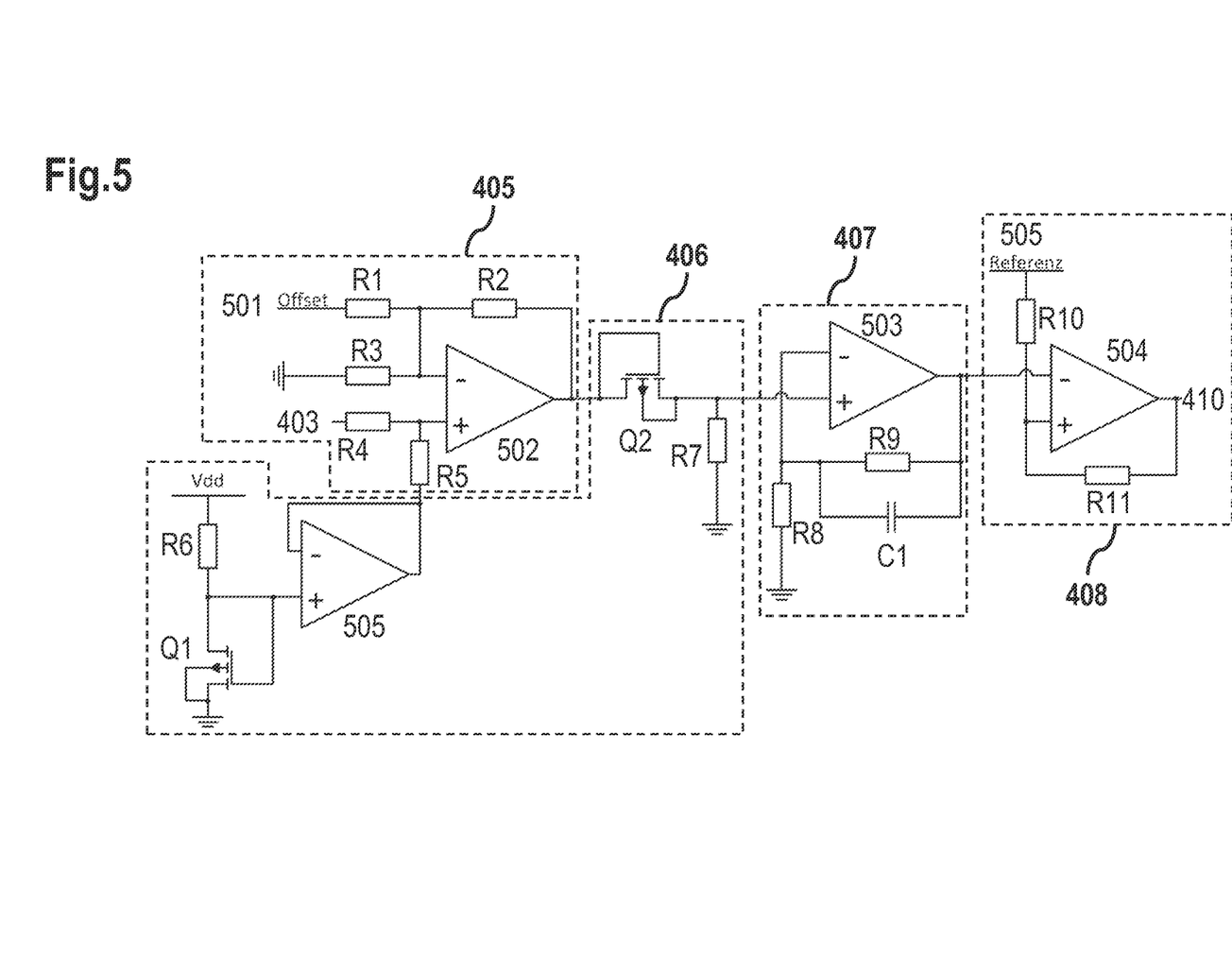
FIG. 5 shows a circuitry of the hardware entity.

FIG. 5 shows an exemplary circuit diagram of the hardware 404. The sensed current 403 is fed via a resistor R4 to the non-inverting input of an operational amplifier 502. The non-inverting input of the operational amplifier 502 is connected via a resistor R5 to the output of an operational amplifier 505. The non-inverting input of the operational amplifier 505 is connected via a resistor R6 to a supply voltage Vdd. Also, the non-inverting input of the operational amplifier 505 is connected to the drain and to the gate of a p-channel MOSFET Q1. The source of the MOSFET Q1 is connected to ground. The inverting input of the operational amplifier 505 is connected to its output.

The inverting input of the operational amplifier 502 is connected via a resistor R3 to ground. An offset 501 is connected via a resistor R1 to the inverting input of the operational amplifier 502. The inverting input of the operational amplifier 502 is connected to its output via a resistor R2.

The output of the operational amplifier 502 is connected to the drain and to the gate of a p-channel MOSFET Q2. The source of the MOSFET Q2 is connected to the non-inverting input of an operational amplifier 503. The non-inverting input of the operational amplifier 503 is connected to ground via a resistor R7. The inverting input of the operational amplifier 503 is connected to ground via a resistor R8. The inverting input of the operational amplifier is connected to its output via a resistor R9. A capacitor C1 is arranged in parallel to the resistor R9. The output of the operational amplifier 503 is connected to the inverting input of an operational amplifier 504.

A reference voltage 505 is supplied to the non-inverting input of the operational amplifier 504 via a resistor R10. The non-inverting input of the operational amplifier 504 is connected to its output via a resistor R11. The output of the operational amplifier 504 supplies the signal 410 which may be fed back to the PROFET (see FIG. 4).

FIG. 5 also identifies the components of the hardware 404, i.e. the offset and scale component 405, the square component 406, the integral and low-pass component 407 and the Schmitt trigger 408. The operational amplifier 505 together with the resistor R6 and the MOSFET Q1 compensate the internal threshold of the MOSFET Q2 such that a squaring the signal at the output of the operational amplifier 502 can be achieved by the MOSFET Q2 without any detrimental impact based on its internal threshold. Such squaring may be based on the boundaries of the MOSFET Q2 between a linear (ohmic) and a saturation (active) mode.

The hardware 404 may be used to implement a fuse, e.g., an ATO use, in particular a fuse characteristics. This characteristics may be adapted to particular use case scenarios. The hardware 404 may also provide temperature compensation means. It is one particular example that one type of hardware 404 can be used for various ATO fuse footprints, e.g., 15A, 20A, 25A. The hardware may be configured via scaling (by, e.g. a resistor), via an offset (e.g., an external voltage or a voltage obtained by a voltage divider) and/or a threshold voltage for the Schmitt trigger.

As indicated above, the electronic fuse may comprise a software entity. There are various ways to model a fuse characteristics by software. One example is using a thermal model.

Figure 6:
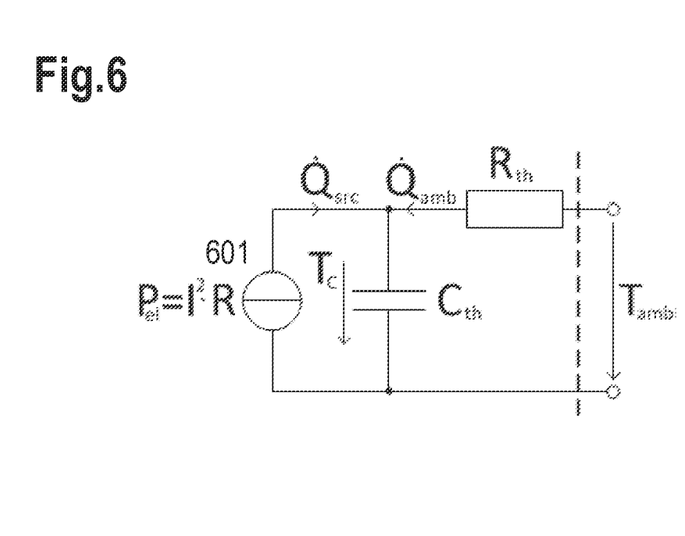
FIG. 6 shows a schematic diagram of a thermal model as it may be used by a software entity.

FIG. 6 shows a schematic diagram to visualize a thermal model of a wire or a fuse. A source 601 supplies a power amounting to $$P_{el} = I^2 \cdot R,$$

wherein I denotes the current and R denotes the internal resistor of the source 601. Based on the internal resistor R heat is generated by this source 601.

A fuse may have a thermal capacity amounting to $C_{th}$. A drain of power to the environment with an ambient temperature $T_{amb}$ is assumed to be limited by a resistor $R_{th}$. Hence, the change of a thermal charge dQ/dt towards the thermal capacity $C_{th}$ stems from the source 601 and from the ambient temperature $T_{amb}$.

An iterative function for the thermal charge $Q_t$ at a time t can be determined as follows:

$$Q_t = Q_{t-1} + \Delta t \cdot \left( I_t^2 \cdot R - \frac{\Delta T_{t-1}}{R_{th}} \right),$$

wherein t−1 indicates a previous iteration and Δt is a sampling rate (amounting, e.g., to 1 ms). The temperature difference between wire and surroundings at a time t can be defined as $$\Delta T_t = \frac{Q_t}{C_{th}}.$$

The (thermal) charge $Q_t$ indicates an energy stored at a time t. An example for a thermal model can be found in US 2010/0254059 A1, which is herewith incorporated by reference.

Figure 9:
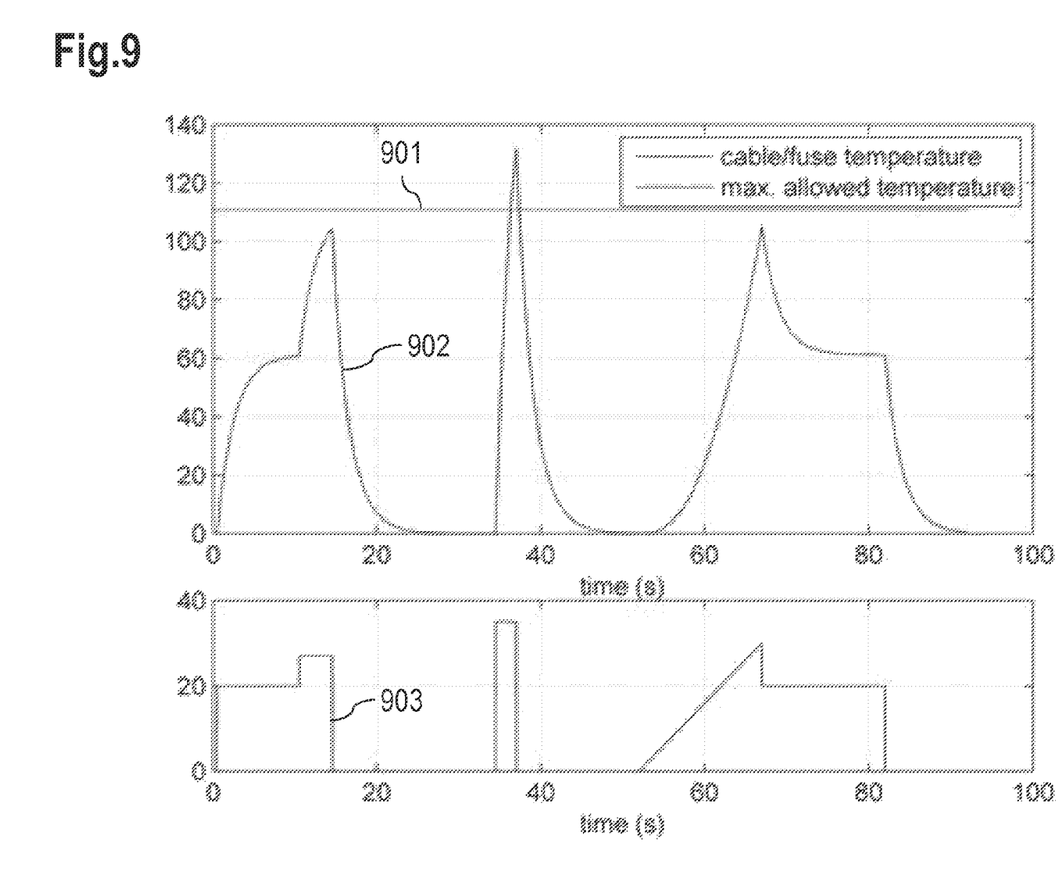
FIG. 9 shows a diagram comprising a graph of a current that results in a temperature change of the cable or fuse; in addition, a threshold indicates a maximum admissible temperature.

FIG. 9 shows a graph of a current 903 (in Ampere) that results in a temperature change of the cable or fuse indicated by a graph 902. Also, a threshold 901 indicates a maximum allowed temperature.

A numeric approach is used to determine the stored energy at each time t. If it reaches and/or exceeds a predetermined threshold the software is able to determine that the electronic fuse shall be activated hence avoiding any further increase of temperature.

Figure 7:
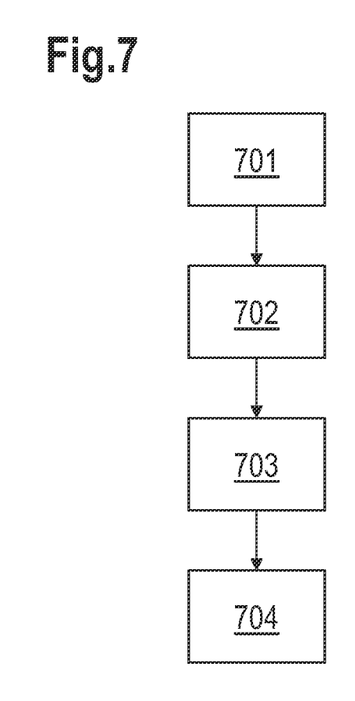
FIG. 7 shows steps of a method that may be provided by a software entity.

FIG. 7 shows a block diagram of an exemplary software running to model a fuse functionality. In a step 701, an analog-to-digital converter provides a digital value for an analog input signal for each sampling interval. A step 702 conducts an averaging of input samples and a step 703 scales and applies an offset to provide a transformation to a current value. A software fuse function 704 determines whether or not the current provided fulfills a switch-off condition.

The approach presented has several advantages. The hardware can be designed to fit into an integrated circuit. Fuse-relevant applications in particular with regard to low-volt scenarios can be simplified, because a centralized fuse box is no longer required. Due to this and to the improved and more accurate fuse characteristics, cables may be shorter and have less diameter. Hence weight can be saved, which results in a lower price and a more efficient system, e.g., vehicle. This is beneficial for the overall energy efficiency. The solution may be integrated in future or existing semiconductor switches. It also improves system security and safety by providing a full system integration.

Figure 8:
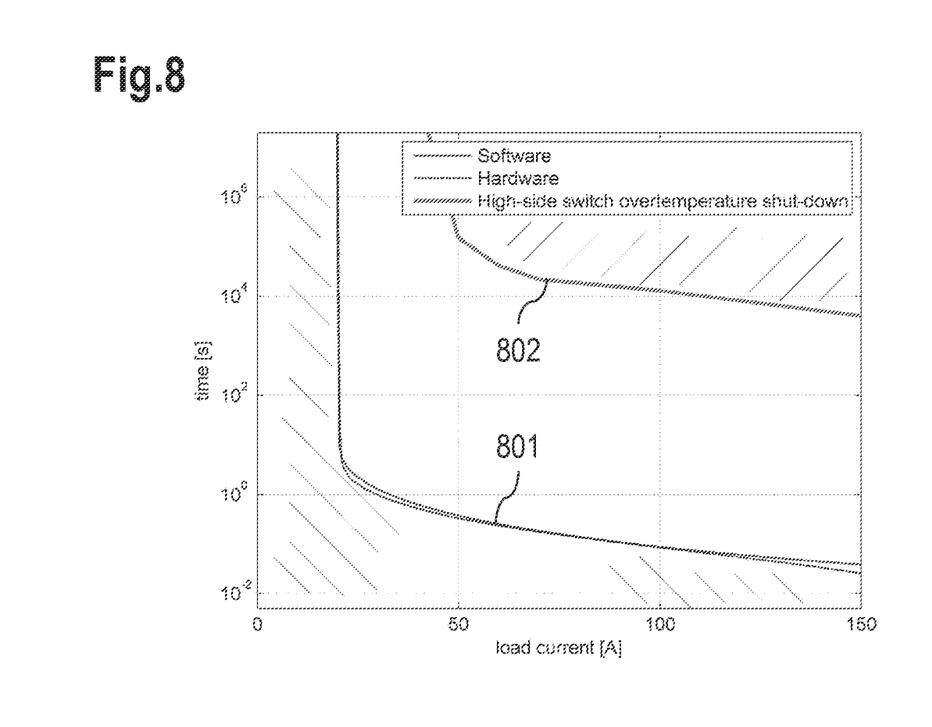
FIG. 8 shows an exemplary fuse characteristics of the switching element, the software entity and the hardware entity.

FIG. 8 shows an exemplary fuse characteristics of the two entities software and hardware, which are here exemplarily (nearly) identical according to a graph 801. In addition, a thermal over-temperature shut-down characteristics of the semiconductor switch itself according to a graph 802 is shown.

The fuse characteristics according to graph 802 protects the cable above the graph 802, whereas the normal mode of operation is below graph 801. This allows protecting the load and/or the cable in multiple ways.

The load is thus safeguarded in a redundant manner via software and via hardware both being part of the electronic fuse. There may be more than one entity, i.e. more than one software and/or hardware modelling a fuse characteristics. For example, several hardware entities and/or several software entities may be used for several fuse characteristics. The respective entities may (at least partially) monitor one another. It is in particular an option, that a software and hardware entity communicate with each other to provide a redundant and safe fuse concept.

Self-diagnosis may be provided by the hardware entity and/or the software entity.

It is noted that the electronic fuse may comprise at least one entity of either hardware or software. It may in particular comprise several entities of hardware and/or software.

It is another option for an exemplary semiconductor switch 901 to comprise diagnosis capabilities for over-temperature and over-current. Software may be used to model the fuse characteristics as described. In addition, the software may also be used for self-diagnosis tasks. For example, such software may periodically (or at predefined timing or based on a trigger) initiate self-diagnosis of the semiconductor switch, e.g., checking the over-current and the over-temperature based on, e.g., externally provided signals.

The examples suggested herein may in particular be based on at least one of the following solutions. In particular combinations of the following features could be utilized in order to reach a desired result. The features of the method could be combined with any feature(s) of the device, apparatus or system or vice versa.

A device is provided, said device comprising
  a switching element,
  an integrated sensor providing a signal,
  an electronic fuse that is arranged
    to determine a fuse condition based on the signal and based on at least one fuse characteristic,
    to trigger a fuse event in case the fuse condition is met.

The fuse condition may be a condition for the electronic fuse to become activated such that any overload situation or damage is prevented from a load that may be part of the device or connected to the device. An exemplary fuse condition is the signal reaching or exceeding (as an alternative: falling below) a predetermined threshold. An unsafe increase of the current (or voltage or temperature) may be detected and the fuse event can be triggered.

The fuse event may be a signal provided by the electronic fuse (to a processing logic controlling the switching element or to the switching element itself) to switch off the switching element in a controlled manner.

The device may be a protected FET (PROFET) or it may comprise a PROFET. It is also an option that the switching element is a PROFET.

In an embodiment, the switching element comprises an electronic switching element or a mechanical switching element.

In an embodiment, the electronic fuse is arranged to not trigger the fuse event in case the fuse condition is not met.

In an embodiment, the integrated sensor is part of the switching element.

In an embodiment, the switching element and the integrated sensor are arranged on a single chip.

In an embodiment, the switching element is a vertical element comprising
  a control terminal,
  a first terminal,
  a second terminal,
  wherein the first and the second terminal are electrically coupled via a signal applied to the control terminal and
  wherein the control terminal and the first terminal are arranged on one side of the vertical element and the second terminal is arranged at the opposite side of the vertical element.

In an embodiment, the switching element comprises at least one of the following:
  a transistor;
  a MOSFET;
  an IGBT;
  a JFET;
  a diode;
  a vertical element;
  a protected FET;
  a high-side switching element;
  a low-side switching element;
  an electrical relay.

In an embodiment, the signal provided by the integrated sensor is a power or a power-based signal.

The signal may in particular comprise a power, a current, a voltage or a temperature.

In an embodiment, the electronic fuse comprises at least one entity, wherein each entity
  determines the fuse condition based on the signal and based on at least one fuse characteristic,
  triggers the fuse event in case the fuse condition is met.

In an embodiment, said entity is a hardware entity or a software entity.

In an embodiment, the software entity utilizes a thermal model and iteratively determines and compares a thermal load with a predefined threshold.

If the threshold is (reached or) exceeded, the fuse condition is met and the fuse event is triggered.

In an embodiment, the entity is arranged for determining the fuse condition based on a fuse characteristics.

In an embodiment, said fuse characteristics is at least partially simulated or modelled by or within the at least one entity.

Hence, the fuse characteristics may be replicated or modelled by the respective entity. Each entity may have a fuse characteristics. Several entities (of the same or of different types, i.e. hardware or software entities) may be provided for redundant or various fuse characteristics.

In an embodiment, at least two entities monitor each other.

It is in particular an option that a software entity and a hardware entity monitor each other.

In an embodiment, the switching element is switched off in case at least one entity triggered the fuse event.

In an embodiment, the fuse condition is determined in case the signal reaches or exceeds a threshold.

In an embodiment, the fuse event is conveyed to the switching element.

In an embodiment, the fuse event is conveyed to a processing logic that controls the switching element.

In an embodiment, the signal is provided by a sensor that is external to the switching element.

In an embodiment, the switching element comprises a thermal over-temperature shut-down functionality.

Also, a method is suggested for controlling a switching element, the method comprising:
  determining a fuse condition based on a signal provided by an integrated sensor of the switching element and based on at least one fuse characteristic,
  triggering a fuse event in case the fuse condition is met.

A device is provided, said device comprising:
  means for determining a fuse condition based on a signal provided by an integrated sensor of the switching element and based on at least one fuse characteristic,
  means for triggering a fuse event in case the fuse condition is met.

A computer program product is suggested, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device comprising:
  a switching element,
  an integrated sensor arranged to provide a signal, and
  a separate electronic fuse that is arranged
    to receive the signal from the integrated sensor,
    to determine a fuse condition based on the signal and based on at least one fuse characteristic, and
    to trigger a fuse event in case the fuse condition is met,
    wherein the electronic fuse comprises both a software entity and a hardware entity, and wherein the software entity and the hardware entity monitor each other and provide separate output signals to a processing logic that controls the switching element to safeguard a load in a redundant manner.

2. The device according to claim 1, wherein the switching element comprises an electronic switching element or a mechanical switching element.

3. The device according to claim 1, wherein the electronic fuse is arranged to not trigger the fuse event in case the fuse condition is not met.

4. The device according to claim 1, wherein the integrated sensor is part of the switching element.

5. The device according to claim 1, wherein the switching element and the integrated sensor are arranged on a single chip.

6. The device according to claim 1, wherein the switching element is a vertical element comprising:
a control terminal,
a first terminal, and
a second terminal,
wherein the first and the second terminal are electrically coupled via a signal applied to the control terminal, and
wherein the control terminal and the first terminal are arranged on one side of the vertical element and the second terminal is arranged at the opposite side of the vertical element.

7. The device according to claim 1, wherein the switching element comprises at least one of the following:
a transistor;
a MOSFET;
an IGBT;
a JFET;
a diode;
a vertical element;
a protected FET;
a high-side switching element;
a low-side switching element; or
an electrical relay.

8. The device according to claim 1, wherein the signal provided by the integrated sensor is a power or a power-based signal.

9. The device according to claim 1, wherein at least one of the software entity and the hardware entity are arranged to:
determine the fuse condition based on the signal and based on at least one fuse characteristic, and
trigger the fuse event in case the fuse condition is met.

10. The device according to claim 9, wherein said at least one entity is both the hardware entity or a software entity.

11. The device according to claim 9, wherein the at least one entity is arranged for determining the fuse condition based on a fuse characteristic.

12. The device according to claim 11, wherein said fuse characteristic is at least partially simulated or modelled by or within the at least one entity.

13. The device according to claim 9, wherein the switching element is switched off in case the at least one entity triggered the fuse event.

14. The device according to claim 1, wherein the software entity utilizes a thermal model and iteratively determines and compares a thermal load with a predefined threshold.

15. The device according to claim 1, wherein the fuse condition is determined in case the signal reaches or exceeds a threshold.

16. The device according to claim 1, wherein the fuse event is conveyed to the switching element.

17. The device according to claim 1, wherein the fuse event is conveyed to a processing logic that controls the switching element.

18. The device according to claim 1, wherein the signal is provided by a sensor that is external to the switching element.

19. The device according to claim 1, wherein the switching element comprises a thermal over-temperature shut-down functionality.

20. The device according to claim 1, wherein the switching element comprises a first output directly connected to a load and a second output coupled an input of the electronic fuse, the second output configured to provide the signal as a load-dependent signal to the electronic fuse.

21. The device of claim 1, wherein at least one of the software entity and the hardware entity may be tested individually on demand, and wherein during such testing the respective other entity is configured to provide the functionality of the electronic fuse.

22. The device of claim 1, wherein the hardware entity comprises:
an offset and scale component coupled to the signal;
a square component coupled to the offset and scale component;
an integrated/low pass filter component coupled to the square component; and
a Schmitt trigger coupling the integrated/low past filter component to an output configured to provide a hardware output signal.

23. A method for controlling a switching element comprising:
receiving, at a separate electronic fuse a signal provided by an integrated sensor of the switching element,
determining a fuse condition by the electronic fuse based on the signal provided by the integrated sensor of the switching element and based on at least one fuse characteristic of the electronic fuse, and
triggering a fuse event by the electronic fuse in response to the fuse condition being met,
wherein the electronic fuse comprises both a software entity and a hardware entity, and wherein the software entity and the hardware entity monitor each other and provide separate output signals to a processing logic that controls the switching element to safeguard a load in a redundant manner.

24. A device comprising:
means for determining a fuse condition based on a load-dependent signal provided to a separate electronic fuse by an integrated sensor of a switching element and based on at least one fuse characteristic, and
means for triggering a fuse event in case the fuse condition is met,
wherein the electronic fuse comprises both a software entity and a hardware entity, and wherein the software entity and the hardware entity monitor each other and provide separate output signals to a processing logic that controls the switching element to safeguard a load in a redundant manner.

25. A non-transitory computer readable medium comprising instructions that, when executed by a digital processing device, cause the digital processing device to:
receive a signal provided by an integrated sensor of a switching element,
determine a fuse condition of a separate electronic fuse based on the signal provided by the integrated sensor of the switching element and based on at least one fuse characteristic of the electronic fuse, and
trigger a fuse event by the electronic fuse in response to the fuse condition being met,
wherein the electronic fuse comprises both a software entity and a hardware entity, and wherein the software entity and the hardware entity monitor each other and provide separate output signals to a processing logic that controls the switching element to safeguard a load in a redundant manner.

* * * * *